United States Patent
Shaker et al.

(10) Patent No.: US 7,077,426 B2
(45) Date of Patent: Jul. 18, 2006

(54) AIR-BAG ARRANGEMENT

(75) Inventors: Anorin Shaker, Chatham (CA); Altay Kismir, Tilbury (CA)

(73) Assignee: Autoliv Development AB, Valgarda (SE)

( * ) Notice: Subject to any disclaimer, the term of this patent is extended or adjusted under 35 U.S.C. 154(b) by 335 days.

(21) Appl. No.: 10/767,379

(22) Filed: Jan. 29, 2004

(65) Prior Publication Data
US 2004/0251666 A1    Dec. 16, 2004

(30) Foreign Application Priority Data
Jan. 29, 2003   (GB)  ................... 0302088.0

(51) Int. Cl.
*B60R 21/231*   (2006.01)
(52) U.S. Cl. .................. 280/730.2; 280/743.2
(58) Field of Classification Search ................ 280/729, 280/730.2, 743.1, 743.2, 749
See application file for complete search history.

(56) References Cited

U.S. PATENT DOCUMENTS

| | | | | |
|---|---|---|---|---|
| 6,106,004 A | * | 8/2000 | Heinz et al. | ................ 280/729 |
| 6,113,141 A | * | 9/2000 | Baker | ....................... 280/743.2 |
| 6,296,276 B1 | * | 10/2001 | Ritter | ....................... 280/743.2 |
| 6,457,745 B1 | * | 10/2002 | Heigl | ....................... 280/743.2 |
| 6,672,612 B1 | * | 1/2004 | Sauer et al. | ............. 280/730.2 |
| 6,883,826 B1 | * | 4/2005 | Fujiwara | ................... 280/730.2 |
| 2003/0011175 A1 | | 1/2003 | Hess et al. | |

FOREIGN PATENT DOCUMENTS

| | | |
|---|---|---|
| EP | 1 184 235 | 3/2002 |
| GB | 2 377913 A | 1/2003 |

* cited by examiner

*Primary Examiner*—David R. Dunn
(74) *Attorney, Agent, or Firm*—Brinks Hofer Gilson & Lione

(57) ABSTRACT

A one-piece woven air-bag in the form of an inflatable curtain has two inflatable regions separated by an uninflatable region which incorporates an expansion panel to relieve excessive tension that may arise within the inflatable curtain. The expansion panel comprises a region where there are two outer layers of fabric interconnected by an intermediate or third layer extending from the first layer to the second layer. Slit lines are provided in the outer layers so that the expansion panel may expand when subjected to tension.

20 Claims, 3 Drawing Sheets

AIR-BAG ARRANGEMENT

CROSS REFERENCE TO RELATED APPLICATION

This application claims priority to GB 0302088.0 filed Jan. 29, 2003, which is currently pending.

BACKGROUND OF THE INVENTION

The present invention relates to an air-bag arrangement, and more particularly relates to an air-bag arrangement for use in a motor vehicle in the form of a so-called "inflatable curtain".

An inflatable curtain is an air-bag or inflatable element which is initially mounted in the roof of a motor vehicle adjacent the side windows of the vehicle. In the event of a specific type of accident, such as, for example, a side impact, the inflatable element inflates, thus extending down to cover the windows in the manner of a curtain. Typically the opposed ends of the lower edge of the inflatable element are secured to mounting points, optionally with the use of straps, and, as the inflatable element inflates, so the length of the lower edge of the inflatable element reduce, thus creating a line of tension extending between the two anchoring points. Thus the inflatable element is held securely in position, minimizing the risk of any part of an occupant emerging through a window during the accident.

It has been proposed to provide certain regions of the inflatable element which do not actually inflate in order to minimize the quantity of gas needed to inflate the inflatable element, and also to ensure that the inflatable element can be inflated in the relatively brief period of time that is typically available in a side impact situation.

While many designs of inflatable curtain have been produced in recent years for use in different types of motor vehicle. It has been found, especially in connection with inflatable elements designed for use in vehicles having a substantial length, such as vehicles of "MPV" type, where the inflatable element can extend from an "A"-Post to a "D"-Post that, excessive tension can occur in parts of the inflatable curtain, thus distorting the inflatable curtain in an undesirable manner.

The present invention seeks to provide an improved air-bag arrangement.

According to this invention there is provided an air-bag in the form of a one-piece woven inflatable curtain, the inflatable curtain defining at least two spaced-apart inflatable regions and an uninflatable region, the uninflatable region incorporating an expansion panel, the expansion panel having two outer fabric layers, the outer fabric layers being interconnected by an intermediate or third layer extending from a first region where it merges with a first of the two outer layers to a second region where it merges with the second of the two outer layers, there being a slit line formed in the first layer between the first region and an adjacent edge of the expansion panel, and there being a further slit line provided in the second layer between the second region and the other edge of the expansion panel.

Preferably there is a second intermediate or third layer extending between the first and second layers of fabric, the second intermediate or third layer extending from a point between the further slit line and the other edge of the expansion panel and a part of the first layer of fabric closer to the other edge of the panel, there being a further slit line formed in the first layer of fabric between the part and the other edge of the panel.

Conveniently wherein the slit line is in the form of an actual slit.

Alternatively the slit line is in the form of a perforated line of slits.

Alternatively wherein the slit line is in the form of a line formed with weak threads configured to rupture when a predetermined tension is applied to them.

Preferably, the uninflatable region is located between and separates two spaced apart inflatable regions.

Alternatively, the uninflatable region is located between one of the inflatable regions and part of the air-bag configured for connection to an anchoring point.

In order that the invention may be more readily understood, and so that further features thereof may be appreciated, the invention will now be described by way of example, with reference to the accompanying drawings in which:

DETAILED DESCRIPTION OF THE INVENTION

Figure 1:
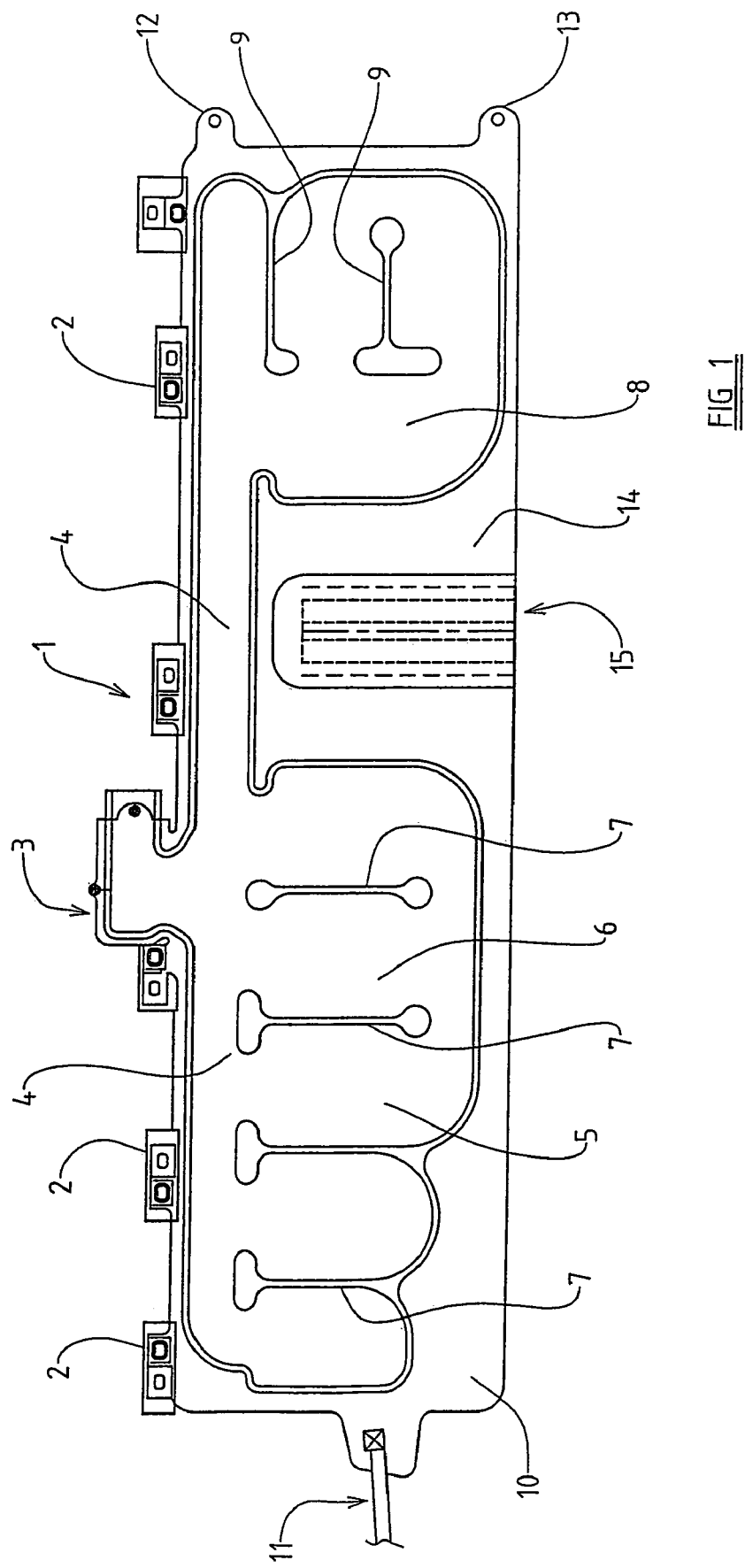
FIG. 1 is a diagrammatic plan view of an air-bag in the form of an inflatable curtain in accordance with the invention.

Referring initially to FIG. 1 of the accompanying drawings, an air-bag 1 in the form of the inflatable curtain is illustrated. The air-bag is of generally rectangular form and is fabricated using a one piece weaving process.

The upper edge of the air-bag is provided with a plurality of mounting lugs 2 configured to co-operate with mounting points provided in a motor vehicle. The upper edge of the air-bag is also provided with a protruding gas inlet neck 3, formed by two super-imposed layers of fabric, bounded by appropriate seams. The neck 3 may receive a gas generator or inflator or may be connected to a source of gas. The neck 3 communicates with a transversely extending gas flow duct 4 which extends across the entire width of the air-bag, adjacent the upper edge. The gas duct 4 is effectively defined by two super-imposed layers of fabric. The gas duct 4 communicates with a first inflatable region 5 divided into pluralities of discrete cells 6 by means of vertical seams 7 which interconnect regions of the two adjacent layers of fabric. The gas flow duct 4 also extends to a second inflatable region 8, where again seams 9 interconnect the two layers of fabric. Around the periphery of the inflatable regions 5 and 8 the fabric is woven as a single layer 10, using the one piece weaving process.

At one end of the air-bag a mounting strap 11 is provided which may, for example, be configured to extend to an anchoring point provided on the A post (or "A pillar") of the vehicle. At the other end of the air-bag two mounting lugs 12, 13 are provided which can be connected to anchoring points provided, for example, on the C post (or "C pillar") of the vehicle, either directly or by means of a strap.

Figure 2:
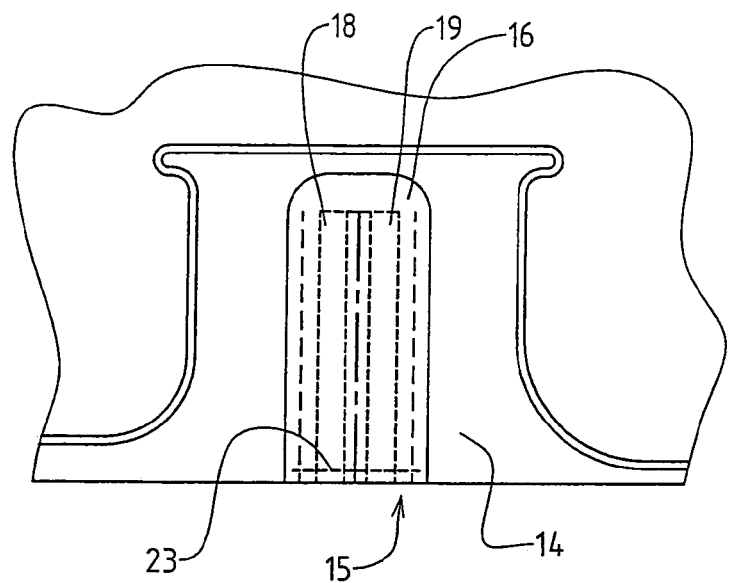
FIG. 2 is an enlarged view of part of the air-bag of FIG. 1.

Between the two inflatable regions 5 and 8 there is an uninflatable region 14, formed partly of a single layer of fabric, which is provided with an expansion panel 15. The expansion panel 15 is shown more clearly in FIGS. 2 and 3.

The expansion panel 15 comprises a region, of inverted "U" shape, in the form of a pocket defined between two outer layers of fabric 16, 17. Contained within the pocket or panel 15 are two separate fabric layers 18, 19 of an intermediate or third layer of fabric, which each extend from the first outer layer or front layer of fabric 16 towards the second outer layer or rear layer of fabric 17 of the panel 15. As can be appreciated from FIG. 3, the third fabric layers 18 and 19 extend from the region of the front fabric layer 16 which are very close to the adjacent edges of the panel 15 where the single layer of fabric of the uninflated region 14 abuts the panel 15, towards the central part of the rear fabric layer 17. Layers 16 and 17 comprise outer layers since they form portions of the exterior of air-bag 1.

A first slit line is provided in the rear outer layer 17 at a point between the regions where the two layers 18 and 19 merge with the rear outer layer 17. Similar slit lines 21, 22 are provided in the layer 16 at points between regions where the intermediate layers 18 and 19 merge with the outer front layer 16 and the adjacent edges of the periphery of the panel 15, where the single layer of fabric abuts the panel 15.

The slit lines may be actual single slits or, alternatively, may be slit lines of such a form that a slit will appear (i.e. splitting of the fabric) if a tension or force in excess of the predetermined threshold is applied. Thus the slit lines may be "perforated" lines, formed of a plurality of regions of actual "slit" separated by smaller regions of fabric or, alternatively, may be formed from fabric woven in such a way that only very weak fibers extend across the slit line, with the intention that the weak fibers will break when a force is applied to the fibers in excess of a predetermined threshold.

Figure 3:
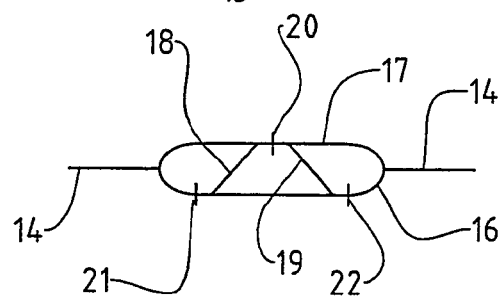
FIG. 3 is a diagrammatic sectional view through part of FIG. 2 in the first condition of the air-bag.

It is to be appreciated that FIG. 3 shows the layers of fabric in an "expanded" state which they would not occupy. The three layers of fabric would be co-planar and in contact with each other.

The panel 15 may be formed having an open lower edge, to facilitate formation of the slits. The slits may thus be cut in the layers of fabric, starting at the lower edge. If this manufacturing technique is utilized the fabric may be woven to mark a slit line, to facilitate the slitting process, and some sort of stitching or weaving may be used to mark the intended position of the uppermost end of each slit line. A "tear" seam 23 shown in FIG. 2 may be provided extending parallel with the lowermost edge of the inflatable curtain 1 across the lowermost part of the expansion panel 15, in order to retain the various layers of fabric constituting the expansion panel in the desired position until the expansion panel is to perform its desired function.

Figure 4:
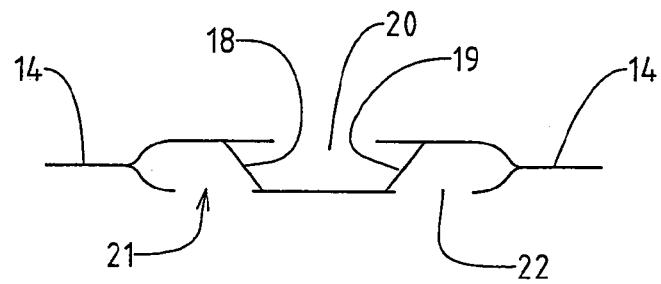
FIG. 4 is a diagrammatic sectional view corresponding to FIG. 3 in the second condition of the air-bag.

If an excessive tension is applied to the expansion panel 15 described above it is to be understood that the slit lines 20, 21, 22 will open to form open-slits. This will enable the two regions of single layer fabric on opposite sides of the panel 15 to move apart, as the opening of the slit 20 will permit the intermediate layers 18 and 19 of fabric to move away from each other, and the opening of the slits 21 and 22 in the front layer of the fabric 16 will facilitate this movement. Thus the components of the expansion panel will be able to move to have the position shown schematically in FIG. 4, with the slit lines 20, 21, and 22 being fully open to form effective slits, as shown. Consequently, the excessive tension occurring in the inflatable curtain may be relieved.

Figure 5:
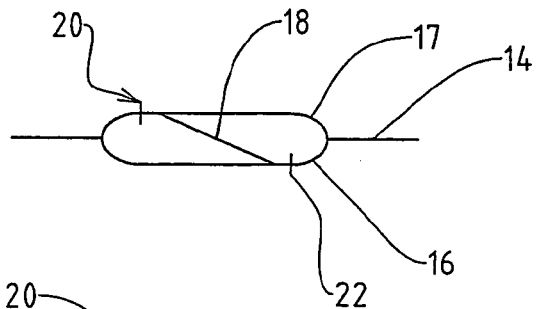
FIG. 5 is a diagrammatic sectional view of part of an alternative embodiment of the invention in the first condition.

Whilst FIGS. 1 to 4 have illustrated an embodiment in which there are two regions of the intermediate third layer 18 of fabric within the expansion panel 15, FIG. 5 illustrates, schematically, a rather simpler embodiment in which a single intermediate region 18 of a third layer extends between regions of the front layer of fabric 16 and the rear layer of fabric 17 in a modified form of expansion panel.

The intermediate third fabric layer 18 extends from region of the front outer layer 16 which is relatively close to the surrounding single layer of fabric 14 and a slit line 22 is provided in the front outer layer 16 between the region where the intermediate third layer 18 merges with the front outer layer 16 and the adjacent edge of the single surrounding layer 14. Similarly the intermediate third layer 18 merges with the rear outer layer 17 at a region spaced not very far from the single layer 14 on the other side of the panel 15. A slit line 20 is provided in the rear outer layer between the region at which the intermediate or third layer 18 merges with the rear layer 17 and the adjacent surrounding edge of single layer of fabric 14 on that side of the panel.

Figure 6:
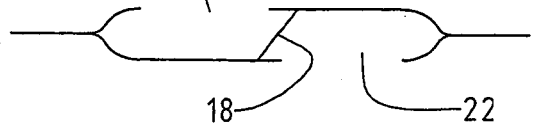
FIG. 6 is a diagrammatic sectional view corresponding to FIG. 5 illustrating the air-bag of FIG. 5 in an alternative condition.

It is to be appreciated that when a substantial tension is applied to the slit lines 20 and 22, the slits will appear and the expansion panel may expand, as illustrated in FIG. 6, again relieving any excessive tension in the inflatable curtain.

Figure 7:
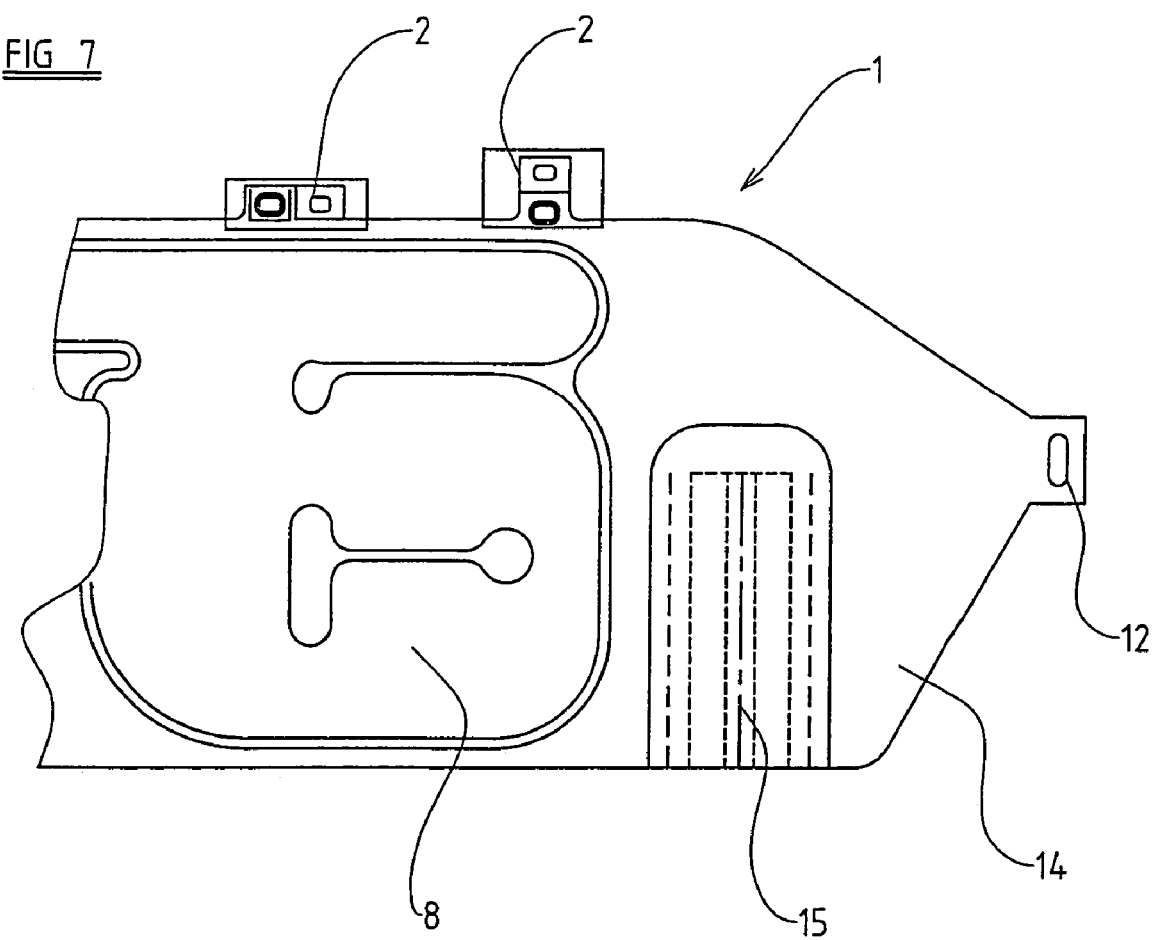
FIG. 7 is a diagrammatic view of the end of an alternative air-bag configuration of the present invention.

Whilst the invention has been described above with particular reference to an arrangement in which the uninflatable region 14 and its associated expansion panel 15 is located between two separated inflatable regions 5, 8, it should be appreciated that the uninflatable region and its associated expansion panel 15 could be located elsewhere on the air-bag arrangement. Such an alternative configuration is illustrated schematically in FIG. 7 which shows one end of an air-bag 1 in the form of an inflatable curtain. This arrangement comprises a single mounting lug 12 to permit connection to anchoring points providing, for example, on the C-post (or "C-pillar") of the motor vehicle, either directly or by means of a strap. In this arrangement, the uninflatable region 14 and its associated expansion panel 15 is located between the rearmost inflatable region 5 and the mounting lug 12, and hence permits the end region of the inflatable curtain 1 to expand, in the same manner as described above in more detail, if excessive tension is applied to the expansion panel 15.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. An air-bag in the form of a woven inflatable curtain, the inflatable curtain comprising at least two spaced-apart inflatable regions and an uninflatable region, the uninflatable region incorporating an expansion panel, the expansion panel having first and second outer fabric layers, the outer fabric layers being interconnected by an intermediate fabric layer extending from a first region where it merges with the first outer fabric layer to a second region where it merges with the second outer fabric layer, there being a first slit line formed in the first outer fabric layer between the first region and a first adjacent edge of the expansion panel, and there being a second slit line formed in the second outer fabric layer between the second region and a second adjacent edge of the expansion panel.

2. An air-bag according to claim 1 further comprising a second intermediate layer extending between the first and the second outer fabric layers, the second intermediate layer extending from a third region where it merges from the first outer fabric layer between the first slit line and the first adjacent edge of the expansion panel and a forth region where the second intermediate layer merges with the second outer layer between the second region and the first adjacent edge and a third slit line formed in the first outer fabric layer between the third region and the first adjacent edge of the panel.

3. An air-bag according to claim 1 wherein at least one of the first or second slit lines are in the form of a single slit.

4. An air-bag according to claim 2 wherein at least one of the first, second, or third slit lines are in the form of a single slit.

5. An air-bag according to claim 1 wherein at least one of the first or second slit lines are in the form of a perforated line of slits.

6. An air-bag according to claim 2 wherein at least one of the first, second, or third slit lines are in the form of a perforated line of slits.

7. An air-bag according to claim 1 wherein at least one of the first, second, or third slit lines are in the form of a line formed with weak threads configured to rupture when a predetermined tension is applied to them.

8. An air-bag according to claim 2 wherein at least one of the first, second, or third slit lines are in the form of a line formed with weak threads configured to rupture when a predetermined tension is applied to them.

9. An air-bag according to claim 1 wherein the expansion panel is traversed by at least one tear seam.

10. An air-bag according to claim 1 wherein the uninflatable region is located between and separates two of said spaced apart inflatable regions.

11. An air-bag according to claim 1 wherein said uninflatable region is located between one of said inflated regions and a part of the air-bag configured for connection to an anchoring point.

12. An air-bag in the form of a woven inflatable curtain, the inflatable curtain comprising at least two spaced-apart inflatable regions and an uninflatable region, the uninflatable region incorporating an expansion panel, the expansion panel having first and second outer fabric layers, the outer fabric layers being interconnected by an a first intermediate fabric layer extending from a first region where it merges with the first outer fabric layer to a second region where it merges with the second outer fabric layer, a second intermediate layer extending between the first and the second outer fabric layers, the second intermediate layer extending from a third region where it merges from the first outer fabric layer and a forth region where the second intermediate layer merges with the second outer layer, there being a first slit line formed in the first outer fabric layer between the first region and the third region, and a second slit line formed in the second outer fabric layer between the second region and a first adjacent edge of the expansion panel, and a third slit line formed in the second outer fabric layer between the forth region and a second adjacent edge of the expansion panel.

13. An air-bag according to claim 12 wherein at least one of the first or second slit lines are in the form of a single slit.

14. An air-bag according to claim 12 wherein at least one of the first, second, or third slit lines are in the form of a single slit.

15. An air-bag according to claim 12 wherein at least one of the first or second slit lines are in the form of a perforated line of slits.

16. An air-bag according to claim 12 wherein at least one of the first, second, or third slit lines are in the form of a perforated line of slits.

17. An air-bag according to claim 12 wherein at least one of the first, second slit or third slit lines are in the form of a line formed with weak threads configured to rupture when a predetermined tension is applied to them.

18. An air-bag according to claim 12 wherein at least one of the first, second, or third slit lines are in the form of a line formed with weak threads configured to rupture when a predetermined tension is applied to them.

19. An air-bag according to claim 12 wherein the expansion panel is traversed by at least one tear seam.

20. An air-bag according to claim 12 wherein the uninflatable region is located between and separates two of said spaced apart inflatable regions.

* * * * *